United States Patent [19]

Perret

[11] E Re. 30,085

[45] Reissued Aug. 28, 1979

[54] METHOD AND APPARATUS FOR THE CODING AND LOW TEMPERATURE LIQUEFACTION OF GASEOUS MIXTURES

[75] Inventor: Jean C. Perret, Versailles, France

[73] Assignee: Compagnie Francaise d'Etudes et de Construction Technip, Paris, France

[21] Appl. No.: 506,165

[22] Filed: Sep. 16, 1974

Related U.S. Patent Documents

Reissue of:

[64] Patent No.: 3,364,685
Issued: Jan. 23, 1968
Appl. No.: 534,830
Filed: Mar. 16, 1966

U.S. Applications:

[62] Division of Ser. No. 868,246, Sep. 29, 1969, now Re. 29,914.

[30] Foreign Application Priority Data

Mar. 31, 1965 [FR] France ..... 65.11371

[51] Int. Cl.[2] ..... F25J 1/00
[52] U.S. Cl. ..... 62/9; 62/40
[58] Field of Search ..... 62/9, 11, 23, 28, 40

[56] References Cited

U.S. PATENT DOCUMENTS 3,763,658 10/1973 Gaumer et al. ..... 62/40

FOREIGN PATENT DOCUMENTS 665385 6/1963 Canada ..... 62/40
1557019 10/1969 France ..... 62/40

*Primary Examiner*—Norman Yudkoff
*Attorney, Agent, or Firm*—Frishauf, Holte, Goodman & Woodward

EXEMPLARY CLAIM

17. A process for totally liquefying a gaseous methane-rich feed stream comprising the steps of:

a. supplying said methane-rich feed stream at a superatmospheric pressure and precooling said stream,
b. providing a multicomponent refrigerant,
c. compressing said multicomponent refrigerant to a superatmospheric pressure,
d. cooling said multicomponent refrigerant and phase separating a single vapor fraction and a single liquid fraction from said cooled multicomponent refrigerant,
e. subcooling said liquid fraction in heat exchange with itself after expansion to form a first subcooled liquid fraction,
f. liquefying and subcooling all of said vapor fraction in heat exchange with said first subcooled liquid fraction, and with itself after expansion, to form a second subcooled liquid fraction, and
g. totally liquefying said precooled methane-rich feed stream by further cooling said precooled methane-rich feed stream to at least its liquefaction temperature, at the superatmospheric pressure thereof, solely by progressive heat exchange steps with said first and second subcooled liquid fractions undergoing vaporization, said methane-rich feed stream and said multicomponent refrigerant being in indirect heat exchange with each other throughout the process.

18 Claims, 4 Drawing Figures

METHOD AND APPARATUS FOR THE CODING AND LOW TEMPERATURE LIQUEFACTION OF GASEOUS MIXTURES

Matter enclosed in heavy brackets [ ] appears in the original patent but forms no part of this reissue specification; matter printed in italics indicates the additions made by reissue.

*This application is a division of Reissue application Ser. No. 868,246, filed Sept. 29, 1969, now patented as Re. 29,914, Feb. 20, 1979.*

This invention deals with a method and apparatus required for partial or total liquefaction with or without sub-cooling of the liquid thus obtained from gas or gas mixtures of which certain components have very low boiling temperatures at atmospheric pressure. It concerns especially a method and apparatus for the liquefaction and sub-cooling to a liquid state of mixtures including light hydrocarbons, nitrogen and helium, for example, and those which cannot be kept in a liquid state in closed containers without refrigeration; that is to say those with a critical temperature lower than the ambient temperature. This invention can be especially applied to natural gas liquefaction, extraction of nitrogen, helium and rare gases.

This invention in its broadest form is not limited to the liquefaction of the gases mentioned hereabove, but applies to any complex gas mixture. It applies especially when it is essential to construct installations processing mixtures of variable and varied composition, having therefore to be extremely flexible.

Moreover, this invention permits the construction of installations with low investment and operating costs.

An important application of this invention includes the liquefaction of natural gas produced in locations separated from the place of consumption by bodies of water, making transport by pipe-line impossible or very costly. In this case, the gas is transported by special ships in liquid form at a pressure slightly above atmospheric pressure and at a temperature of about the bubble point; the evaporation of a part of the liquid produces the refrigeration effect required to maintain the cargo cold and the gas thus evaporated can be used as fuel for the ship's engines.

Up to the present the liquefaction of natural gas without expansion supplying work has been made by, amongst others, the following two methods:

The first uses several refrigeration cycles, each cycle using an essentially pure refrigerating fluid. For example, such a system can use propane for the first cycle between the ambient temperature and −35° C., ethylene for the second cycle between temperatures of −35° C. and −100° C., methane for the third cycle between temperatures of −100° C. and −160° C., and if necessary a fourth cycle with nitrogen to reach a temperature lower than −160° C. In order to lessen the energy consumption, each cycle of this system consists itself of several temperature stages, these being obtained by controlling at different levels, the boiling pressure of the refrigerating fluid. The consequence of this is an expensive multiplication of equipment: heat exchangers, piping, control equipment, compressors. This complexity leads to high investment costs. Moreover this system is not very flexible and is difficult to adjust as soon as the real conditions vary a little from the basic conditions.

The second method uses the gas itself as the refrigeration fluid; however, this other solution requires important auxiliary equipment which considerably increases the complexity of the system and the power required to accomplish liquefaction.

The principal object of the present invention is to provide a method and apparatus for carrying out continuous, total, or partial liquefaction, with or without sub-cooling, of the liquid thus obtained from the gaseous mixtures, whose critical temperature is lower than the ambient temperature.

Another object of the present invention is to provide a method and apparatus for carrying out continuous liquefaction of gaseous mixtures, whose composition can vary from time to time, and this under conditions near to the optimum for a fairly wide range of variations.

Another object of the present invention is to provide apparatus for carrying out the continuous liquefaction of gaseous mixtures with minimum capital and operation costs.

A specific object of the present invention is to provide a method for the continuous liquefaction of gaseous mixtures in which the cold producing fluid or refrigerating fluid is a mixture of several components which mixture is chosen to allow the liquefaction of the gaseous mixtures under the most efficient conditions.

Another object of the present invention is to provide an apparatus for carrying out the liquefaction of gaseous mixtures in which the composition of the refrigerating fluid can be modified so as to maintain the operating conditions close to the optimum.

Another object of the present invention is to provide a method and apparatus for continuous, total, or partial liquefaction, with or without sub-cooling of the liquid thus obtained from the gaseous mixtures by counter-current surface heat exchange with a refrigerating fluid of varying composition at several points in the cooling circuit, the refrigerating fluid itself being, when compressed, a gaseous mixture distinct from the mixture to be liquefied, this fluid being continuously recirculated, while the gas to be liquefied only passes through the exchanger system once.

Another object of the present invention is to provide a method and an apparatus permitting the continuous cooling, the condensation under a certain pressure of the natural gas and its sub-cooling to a liquid state down to a temperature near or equal to its bubble temperature at atmospheric pressure by counter-current indirect heat exchange between said natural gas and said fractions of a refrigerating fluid comprising mainly methane, ethane, propane, butanes, pentanes, but also possibly containing small quantities of more volatile substances, nitrogen and helium, for example, and less volatile substances, such as hexanes, heptanes, octanes. This is an inexpensive cold producing fluid (refrigerating fluid) easily obtained since it is made up of the hydrocarbons of the gases contained in the natural gas or in the liquid usually present in the natural gas before its processing in the field, prior to its transport by pipe-line.

The different objects are obtained in accordance with the invention by way of a process of liquefaction of a mixture of gas hereafter called a "first gas mixture," characterized by the fact that this gas mixture passes through a first system of liquefaction, in indirect contact with and in a direction opposite to a refrigerating liquid in the process of vaporization, introduced in portions at several points, these portions being increasingly volatile in the direction followed by the first gas mixture, said portions of refrigerating liquid resulting from the liquefaction in successive stages, into a second liquefaction system, of a second gas mixture obtained by vaporization of the refrigerating liquid in said systems of liquefaction, this second liquefaction resulting from the vaporization with indirect contact of at least one part of the condensate of each previous stage, with the exception of the first condensate which is obtained by compression of the second gas mixture, the pressure of vaporization in the first liquefaction system being lower than the pressure of vaporization in the second liquefaction system.

The absolute vaporization pressure in the first liquefaction system will usually be between about 0.4 and about 3 atmospheres, preferably between about 1 and about 1.5 atmospheres.

The absolute vaporization pressure in the second liquefaction system will usually be between about 4 and about 8 atmospheres, preferably between about 5 and about 7 atmospheres.

The absolute liquefaction pressure of the first gas mixture is preferably between about 30 and about 100 bars, whereas the absolute liquefaction pressure of the second gas mixture is usually selected to be higher than about 31 bars, for example between about 31 and about 50 bars.

The adoption of a vaporization pressure in the second liquefaction system which is higher than that of the first system, constitutes an essential feature of the invention.

In fact, under these conditions, power consumption is greatly reduced.

On the other hand, the losses in heat are reduced on account of the fact that the liquefaction in the second liquefaction system is effected at relatively high temperatures.

Finally, this difference in pressure makes it possible to utilize a cold producing fluid of a low nitrogen content or a low content of another gas having a low boiling point. The liquefaction of such a fluid requires a less high power consumption.

Another preferred feature of the invention is the fact that the gas mixture is circulated from below moving upwardly, and the refrigerating fluid downwardly from above, throughout the first and-or second liquefaction system. Such manner of procedure provides a number of practical advantages. In particular, pipes of large volume in which the gas circulates, can be placed near the ground, close to the compressor. These pipes may be short which reduces the cost of installation and operation by reducing the losses in load. Only pipes of a small diameter destined for liquified gases are connected to the highest parts of the system. This arrangement is also more advantageous than the use of exchangers arranged successively at the same level. In fact, in the latter case, connecting pipes between the different apparatuses must be provided which are fairly long, for example for letting the partially liquified gas rise again from one level to the next.

Another preferred feature resides in refrigerating fluids of particular composition.

The composition of the cold producing fluid may vary somewhat with the composition of the gas to be liquefied and with the liquefaction pressure; in the same manner, the nitrogen content of the cold producing fluid depends upon the temperature at which the liquefied natural gas is to be sub-cooled.

Generally, the refrigerating fluids have the following composition in the gaseous state:

| | `Percent by volume |
|---|---|
| Nitrogen and more highly volatile gases (for example helium) | 0–3 |
| Methane | 20–32 |
| Ethane | 34–44 |
| Propane | 12–20 |
| Butanes | 8–15 |
| Pentanes and heavier fluids | 3–8 |

According to a preferred form of application, the content of nitrogen and more volatiles is between about 0.5 and about 2%.

Refrigerating fluids of the composition given above, can be utilized in practically all cases of liquefaction of natural cases containing methane as the main component. With such refrigerating fluids, power consumption is reduced to a minimum.

These and other objects of this invention will become apparent in thwe following description of the invention as it could be applied, for example, to the liquefaction of a natural gas in view of its transportation by sea or river ships.

For example, the gas could have the following composition and be available at a pressure of 39 bars absolute:

| | Percent by volume |
|---|---|
| Nitrogen | 1.8 |
| Methane | 87.0 |
| Ethane | 7.3 |
| Propane | 2.5 |
| Butanes | 1.2 |
| Pentanes and less volatiles | 0.2 |

Figure 1:
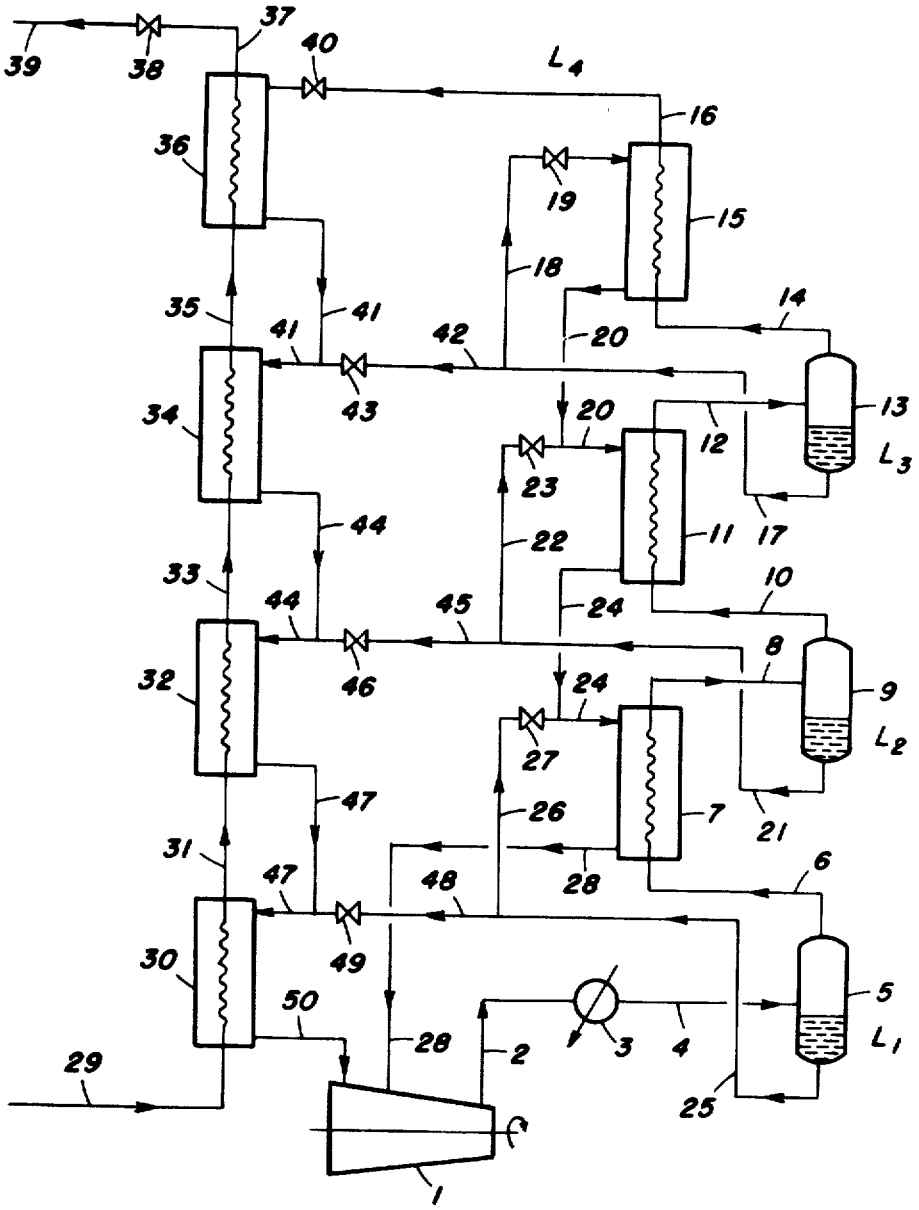
FIG. 1 illustrates a simple application of the invention.

FIG. 1 illustrates a simple application of the invention. A refrigerating fluid, after being compressed in compressor 1 up to an absolute pressure of 37.5 bars, for example, is admitted through line 2 into the indirect contact surface condenser 3 (wherein air or water is used for example). The fluid is partially condensed when it comes out of condenser 3 through line 4. It is then passed to drum 5. Liquid condensate called L1 is collected in drum 5 while the vapor in drum 5 is introduced through line 6 into the tubes of condenser 7 from which it comes out partially condensed through line 8, for passage to drum 9. Liquid condensate called L2 is collected in drum 9 while the vapor of the fluid in line 8 is introduced through line 10 into the tubes of condenser 11, from which it comes out partially condensed through line 12 and through which line it passed to drum 13. Liquid condensate called L3 is collected in drum 13 while the vapor therein is introduced through line 14 into the tubes of condenser 15 from which it comes out completely condensed through line 16; this condensate, called L4 feeds the shell of exchanger 36.

The stepwise condensation of the cold producing fluid is obtained in the following manner. A part of the condensate L3 through lines 17 and 18 is injected through expansion valve 19 into the top of the shell of condenser 15 wherein it partially vaporizes while descending counter-currently with the fluid condensing within the tubes of condenser 15. From the bottom of the shell of condenser 15, partially vaporized L3 is introduced into the top of the shell of condenser 11 through line 20. A part of the condensate L2 from lines 21 and 22 is injected through expansion valve 23 into line 20. The resulting mixture of L3 and L2 is passed into the shell of condenser 11 wherein it vaporizes while descending counter-currently with the fluid condensing within the tubes of 11. From the bottom of the shell of condenser 11, the vaporized L2–L3 mixture is passed through line 24 and is introduced into the top of the shell of condenser 7. A part of the condensate L1, in lines 25 and 26, is injected through expansion valve 27, and is mixed with the vapor in line 24. The resulting mixture of L3, L2 and L1 vaporizes and is superheated while descending counter-currently with the fluid condensing in the tubes of condenser 7. From the bottom of the shell of condenser 7, the mixture of L3–L2–L1 in a superheated vapor state is introduced through line 28 to an intake of compressor 1.

The natural gas to be liquefied enters through line 29 into the tubes of exchanger 30, then successively through line 31 into the tubes of exchanger 32, then through line 33 into the tubes of exchanger 34, then through line 35 into the tubes of exchanger 36, from which it comes out in a sub-cooled liquid state through line 37, then through valve 38 and line 39 to storage. All the exchangers are wall-contact type. The condensate L4 passing through line 16 and expansion valve 40 is injected into the top of the shell of exchanger 36, in which it partially vaporizes counter-currently with the natural gas circulating in the tubes thereof. From the bottom of the shell of exchanger 36, condensate L4 is introduced into the top of the shell of exchanger 34 through line 41. In line 41, a part of the condensate L3 in lines 17 and 42 is injected through expansion valve 43. The mixture of L4 and L3 vaporizes while descending counter-currently with the natural gas circulating inside of the tubes of exchanger 34. From the bottom of exchanger 34, the mixture of L4 and L3 is introduced into the top of the shell of exchanger 32 through line 44. A portion of the condensate L2, from lines 21 and 45, is injected through expansion valve 46 into line 44. The mixture of L4–L3–L2 vaporizes while descending counter-currently with the natural gas circulating inside of the tubes of exchanger 32. From the bottom of the shell of exchanger 32, the mixture L4–L3–L2 is introduced into the top of the shell of exchanger 30 through line 47. Part of the condensate L1 in lines 25 and 48 is injected through expansion valve 49 into line 47. The mixture of L4–L3–L2–L1 vaporizes and is superheated while descending counter-currently with the natural gas circulating in the tubes of exchanger 30. The mixture of L4–L3–L2–L1, in a superheated vapor state, is passed from the bottom of exchanger 30 through line 50 to an intake of the compressor 1.

It should be understood that, instead of the 4 exchangers 30, 32, 34 and 36, a smaller number of exchangers can be used. For example, a single exchanger of much greater length with the same number of injections of the cold-producing fluids (refrigerating fluids) in lines 16, 42, 45 and 48 and the expansion valves 40, 43, 46 and 49 can be used. In this case the connecting lines 41, 44 and 47 are unnecessary.

It should be understood that, instead of the three condensers 7, 11 and 15, only one condenser, for example, can be used in which the condenser bundles would be stacked, and the condenser shell would have the same number of points for the injection of the cooling fluids through lines 26, 22 and 18, and expansion valves 27, 23 and 19. The connecting lines 24 and 20 would then be unnecessary. These exchangers and condensers can be, for example, coiled tube type or multiple plate type exchangers.

The two refrigeration circuits for cooling and condensation of the natural gas on the one hand and for condensation of the condensates of the cold-producing fluid on the other hand, operate under different pressures, the first one at a lower pressure than the second one. Since the pressure is not the same in the two circuits, two or three compression casings can be used on the same drive shaft with intermediary cooling if necessary, the regulation of the lowest suction pressure being made, for example, by means of variable inlet guide vanes. This system has the advantage of only requiring one driving machine.

Figure 2:
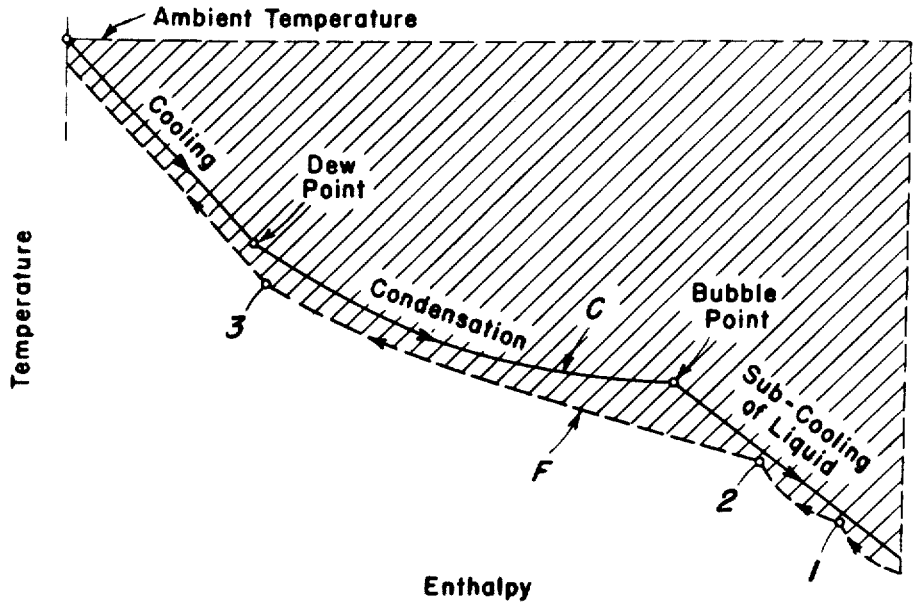
FIG. 2 shows the heat-temperature relationship between the processed natural gas and the cold-producing fluid or refrigerating fluid.

Curve C in FIG. 2 represents the evolution of natural gas under a certain pressure. The quantity of heat called enthalpy (H) is shown as the abscissa and temperature (T) while cooling is shown as the ordinate. This curve is characterized by three special sections: the first one between the ambient temperature (A) and the dew point (B) corresponds to the gas cooling while in the vapor state; the second section between the dew point (B) and the bubble point (D) represents the progressive condensation of the vapor, the mixture being entirely liquid at the bubble point temperature; and the third section below the bubble point temperature represents the subcooling of the liquid obtained by condensation.

Curve F in FIG. 2 represents under the pressure of vaporization of the condensates of the cold-producing fluid, the variation of enthalpy of a cold-producing fluid taken, as an example, in terms of the vaporization temperature. This curve shows a certain number of angular points corresponding to the injection points of the condensates points 1 and 2, and point 3 corresponds to the beginning of the superheating of the cold-producing fluid.

The work of cooling of the natural gas is linked to the cross-hatched area in FIG. 2; work increases when the surface of this area increases. The minimum work is obtained when curve F merges with curve C but this would correspond to an infinite heat exchange surface because the difference of temperature would be zero at every point. On the other hand a curve F, whose temperatures at each point are markedly lower than the corresponding temperature of curve C, leads to a limited exchange surface but to increased work.

Figure 3:
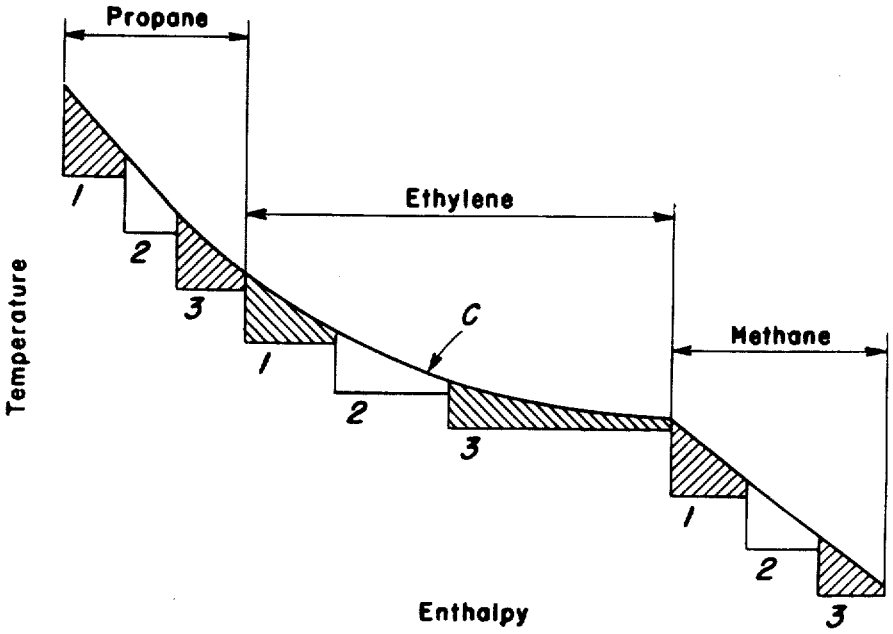
FIG. 3 shows, in order to allow the comparison, the same relation as FIG. 2, in the case of a three cycle cold-producing process.

In order to facilitate the comparison between this process and the well known three cycle cold-producing process, FIG. 3 represents, using the same curve C as in FIG. 2, the operation of a well known process using three cooling cycles, each cycle itself being divided into three pressure stages, the enthalpy temperature curve of the cold-producing fluids is a step-like curve requiring in the case shown here nine different exchangers. For example, cycle J relates to prepare, cycle K to ethylene and cycle L to methane. The three pressure stages of each cycle are numbered 1, 2 and 3.

The pressure to which the gas is available at the entry of the liquefaction installation has an influence on the power required for liquefying the gas and sub-cooling it.

If it is wished to sub-cool a natural gas in the liquid state down to a temperature near or equal to its bubble point temperature at atmospheric pressure, a pressure more or less equal to the pressure at which, in general, liquefied natural gas is stored, it is necessary, either to drop the pressure of the cold-producing circuit to allow the condensate rich in methane to do this cooling, which adds to the power required for compression, or to incorporate in the cold-producing fluid a certain quantity of a more volatile component than methane in order to lower the vaporization temperatures in the temperature zone under consideration. This more volatile component can be nitrogen, for example, whose boiling temperature at atmospheric pressure is −195.8° Celsius.

Due to the concentration action of the successive condensation steps a relatively small quantity of nitrogen, up to 2%, in the cold-producing fluid at the compressor discharge will produce much larger concentrations in the last and final condensate, so that it is possible at the same pressure to considerably lower the bubble point temperature, 15° Celsius for example. The presence of nitrogen modifies the vaporization curve in its coldest position by removing the almost constant step existing in the vaporization curves of fractions rich in methane without more volatile components, but to take full advantage of this new form of curve, the liquid condensate must be sub-cooled down to a very low temperature, practically down to the outlet temperature of the liquefied natural gas.

The discharge pressure of the compressor also determines the composition of the cold-producing fluid especially with regards to the quantities of hydrocarbons heavier than propane. Indeed, the condensation temperature of the first condensate being determined by the nature and temperature of the natural fluid for final heat removal (air or water, for example), the composition of the cold-producing fluid must be such that the pressure prevailing in the cold-producing circuit at condenser 3 in FIG. 1 (pressure directly linked to that of the compressor discharge), the quantity of condensate L1 collected in the drum 5 should be able to meet, on the one hand, the refrigeration requirements of condenser 7, in a mixture with the fractions of L2 and L3 injected in the colder condensers of this circuit, and on the other hand, if necessary, the refrigeration requirements of the exchanger 30 in a mixture with the fractions of L2, L3 and L4 injected in the colder exchangers of this circuit counter-currently with the natural gas.

This is obtained by introducing hydrocarbons heavier than propane into the cold-producing fluid. Introduction of a certain amount of butanes appears, at first sight, to be sufficient to do this, however, a closer look at the problem, discloses that it would be more advantageous to replace a part of these butanes by pentanes, and even heavier, hexanes and heptanes, which when present in smaller quantities produce the same effect for this precise point and have the advantage of improving the liquid vapor separation of the other components through a better selectivity of said separation.

The discharge pressure of the compressor, pressure which determines the condensation pressures of the successive liquid condensates, is linked to the suction pressure of the cold-producing fluid ensuring these condensations-suctions which in effect determines the vaporization pressures of the condensate mixtures through several actions. The first one through the compression ratio which determines the power required for the condensations of the liquid condensates of the cold-producing fluid. The others are concerned with the heat exchange in the condensers between the condensing vapors and the vaporizing or superheating of the cold-producing fluids. The complete condensation of the residuary vapor and a part of the sub-cooling of this condensate in condenser 15 is done by vaporization of condensate L3 coming from the same drum 13 as said vapor. This partly or completely vaporized condensate leaves condensor 15 at a temperature necessarily lower than the temperature of the vapor and liquid in drum 13.

Under a vaporization pressure sufficiently low, the condensate leaves condenser 15 completely in a state of super heated vapor. At a pressure higher than the preceding one (condenser 11), the condensate comes out, at its dew point temperature. At any pressure above the latter the condensate comes out partially vaporized, the liquid fraction vaporizing only when mixed with L2 in condenser 11.

Therefore, as the vaporization pressure increases, thus reducing the compression ratio and therefore the power for an equal out-put, the quantity of the condensate L3 slightly increases, up to the corresponding pressure at the outlet to its dew point; then increases relatively more quickly when the vaporized percentage at the outlet decreases. The reduction of the compression ratio is counter-balanced by the increase in the out-put of L3, which also leads to an increase in the out-put of L2, then an increase of L1.

This system its started-up by introducing in drum 5 propane and the heavier hydrocarbons in liquid form. These are easily obtained commercially and it is no problem to keep them liquid under pressure at the ambient temperature, afterwards it is only necessary to add the other components in gaseous form. These are easily extracted from the natural gas to be liquefied, in order to progressively put into operation the system for cold-producing fluid condensation and then the natural gas liquefaction system.

For the best operation of the system the composition of the cold-producing fluid must be varied according to the seasonal variations of the heat evacuation agent (water or air); for example, the heavy hydrocarbons content must be increased in summer as against that necessary during winter.

Contrary to processes using several refrigeration cycles with essentially pure components and which lack flexibility, the process of the present invention can be easily adapted to any changes in the natural gas composition or pressure, by slight modification of the cold-producing fluid composition.

A practical example is given below of an application of the invention illustrated in FIG. 4.

The natural gas could be defined as follows and be available at a pressure of 39 bars, for example:

| | Percent by volume |
|---|---|
| Nitrogen | 1.8 |
| Methane | 87.0 |
| Ethane | 7.3 |
| Propane | 2.5 |

-continued

| | Percent by volume |
|---|---|
| Butanes | 1.2 |
| Pentanes and less volatile fluids | 0.2 |

It is desired to obtain the liquid sub-cooled at the temperature of −154° C.; the cold-producing fluid composition would be as follows:

| | Percent by volume |
|---|---|
| Nitrogen | 0.5 |
| Methane | 26.5 |
| Ethane | 39.6 |
| Propane | 16.1 |
| Butanes | 12.6 |
| Pentanes and less volatile fluids | 4.7 |

The cold-producing fluid having the composition indicated above leaves compressor 101 under an absolute pressure of 37.5 bars and at a temperature of about 100° C. through line 102 towards the water-condenser 103 which it leaves partially condensed through line 104. Liquid condensate L1 is recovered in drum 105 at the absolute pressure of 37 bars and a temperature of 40° C. Vapor in drum 105 is introduced through line 106 into the partial condenser 107, from which it comes out partially condensed through line 108. Liquid condensate L2 is recovered in drum 109 at an absolute pressure of 36.5 bars and a temperature of −6° C. Vapor in drum 109 is introduced into condenser 111, through line 110, from which it comes out, partially condensed, through line 112. Liquid condensate L3 is recovered in drum 113 at an absolute pressure of 36 bars and a temperature of −66° C. Vapor in drum 113 is introduced through line 114 into condenser 115, wherein this vapor is entirely condensed and the liquid so obtained is sub-cooled down to the temperature of −123° C. under an absolute pressure of 35.5 bars. Condensate L4 leaves the condenser 115 through line 116. It is to be noted that the condensation takes place at an approximately constant pressure.

The condensations are achieved in the following manner. Condensate L3 recovered in drum 113 is introduced into the tubular bundle located in the shell of the condenser 115, from which it comes out cooled at the temperature of −123° C., through line 118. One part of this sub-cooled condensate is injected through line 119 and expansion valve 120 into the upper part of the condenser shell of condenser 115 wherein there is an absolute pressure of 4 bars. The sub-cooled condensate is vaporized partially while gravitating counter-currently with the two fluids in the tubular bundles in condenser 115 and comes out of the lower end of this shell nearly totally vaporized at a temperature of −72° C.; it is then introduced into the upper part of the condenser shell 111 through line 121.

One portion of condensate L2 is recovered in the drum 109 and is introduced through line 122 into a tubular bundle located in condenser 111 from which it comes out sub-cooled at the temperature of −66° C. through line 123 to be injected through expansion valve 124 into line 121 wherein it mixes with the fraction L3. The temperature of the liquid-vapor mixture so obtained is −75° C. The liquid-vapor mixture is introduced into the upper part of the condenser shell of condenser 111 and is vaporized counter-currently with both fluids in the tubular bundles in condenser 111. The vaporized mixture comes out of the lower end of this shell in the vapor state at the temperature of −13° C. and proceeds through line 125 towards the upper part of the shell of condenser 107.

Condensate L1 recovered in drum 105 is passed through line 126 and the expansion valve 127, and is injected into line 125 in which it is mixed with the vapor coming out of the shell of the condenser 111. The temperature of the liquid-vapor mixture thus obtained is −18° C. This mixture is vaporized and is superheated while gravitating in the shell of condenser 107 counter-currently with the condensing fluid and comes out at the bottom of the shell of condenser 107 at a temperature of 27° C. through line 128 towards the intake of compressor 101.

The natural gas is introduced through line 129 under an absolute pressure of 39 bars and a temperature of 38° C. into the tubular bundle of exchanger 130 from which it comes out at the temperature of −6° C. in a vapor state. The vapor then passes through line 131 into tubular bundle of exchanger 132, from which it comes out in liuqid state at a temperature of −123° C. The liquid then passes through line 133 into the tubular bundle of exchanger 134, from which it comes out at the temperature of −143° C., thence through line 135 into the tubular bundle of exchanger 136, from which it comes out through line 137 at the temperature of −154° C. and thence through expansion valve 138 and line 139 to storage.

The cooling of natural gas is carried out as follows. The most volatile condensate leaves condenser 115 at a temperature of −123° C., through line 116; it is sub-cooled in a tubular bundle of exchanger 134, from which it comes out at a temperature of −143° C. through line 140. It is sub-cooled again in a tubular bundle of exchanger 136, from which it comes out at the temperature of −154° C. through line 141. It is afterwards expanded through valve 142 in the upper part of the shell of exchanger 136, where it enters at the temperature of −159° C. under an absolute pressure of 2 bars. It is partially vaporized while gravitating within the shell counter-currently with the two fluids in the process of being cooled in exchanger 136 to come out at the bottom of the shell of 136 partially vaporized at a temperature of −150° C. It is then introduced into the upper part of the shell of exchanger 134 through line 143.

Condensate L3 has been sub-cooled down to −123° C. in exchanger 115. The fraction of this condensate which is not injected in the exchanger 115 through line 119 and valve 120 is introduced via line 118 into the tubular bundle of exchanger 134, from which it comes out at a temperature of −143° C. through line 145, in order to be injected through expansion valve 146 into line 143. The liquid-vapor mixture so obtained has a temperature of −147° C. It is vaporized partially while gravitating into the shell of exchanger 134 counter-currently with three fluids being cooled therein, and it comes out at the bottom of the shell of 134, partially vaporized, at a temperature of −131° C. It is then passed to the upper part of the shell of exchanger 132 through line 147.

Condensate L2 collected in drum 109 has been partially used up in condenser 111. The remainder of it is introduced via line 148 into the tubular bundle of exchanger 132 from which it comes out sub-cooled at the temperature of −123° C. through line 149 to be injected through expansion valve 150 into line 147. The liquid-vapor mixture so obtained has a temperature of −128° C. It is vaporized and superheated while gravitating counter-currently with two fluids being cooled in exchanger 132 and comes out of the bottom of the shell of 132 in the vapor state at the temperature of −134° C. It is then introduced via line 151 into the top of the shell of the exchanger 130 wherein it is superheated counter-currently with natural gas and comes out strongly superheated at the bottom of the shell through line 152 towards the suction of compressor 101.

At the suction end of the compressor 101 in line 152, the absolute pressure is about 1.5 bars corresponding to the pressure at the top of the shell of exchanger 136, that is 2 bars minus the pressure drop through the cold-producing circuit. Consequently, one can see that the cold-producing fluid circulates at an almost constant pressure. At the suction end of compressor 101 in line 128, the absolute pressure is approximately 3.5 bars corresponding to the pressure at the top of the shell of condenser 115, that is 4 bars minus the pressure drop in this cold-producing circuit. Consequently, the cold-producing fluid has circulated at an almost constant pressure.

It should be understood that, instead of 4 exchangers 130, 132, 134, 136, it is possible to use a lesser number of shells by grouping the bundles of several exchangers within the same shell. For instance, one single shell could be used comprising the same number of injections of cold-producing condensates through lines 141, 145 and 149 and expansion valves 142, 146 and 150. Connecting lines 143, 147 and 151 are then unnecessary.

It should be understood also that, instead of 3 condensers 107, 111 and 115, one single shell could be used, for example, one single shell in which the tubular bundles would be stacked. In such a shell, there would be achieved the same number of injections of cold-producing condensates through lines 119, 123 and 126 and expansion valves 120, 124 and 127. Connecting lines 121 and 125 are then unnecessary.

It is advantageous to position in line 135, between exchangers 134 and 136, a flash drum (not shown) wherein gases of low boiling point, such as helium, and other gaseous impurities may be removed from the material in line 135 through an overhead line (not shown) of this flash drum. The condensate formed in this flash drum is passed upwardly through line 135.

Figure 4:
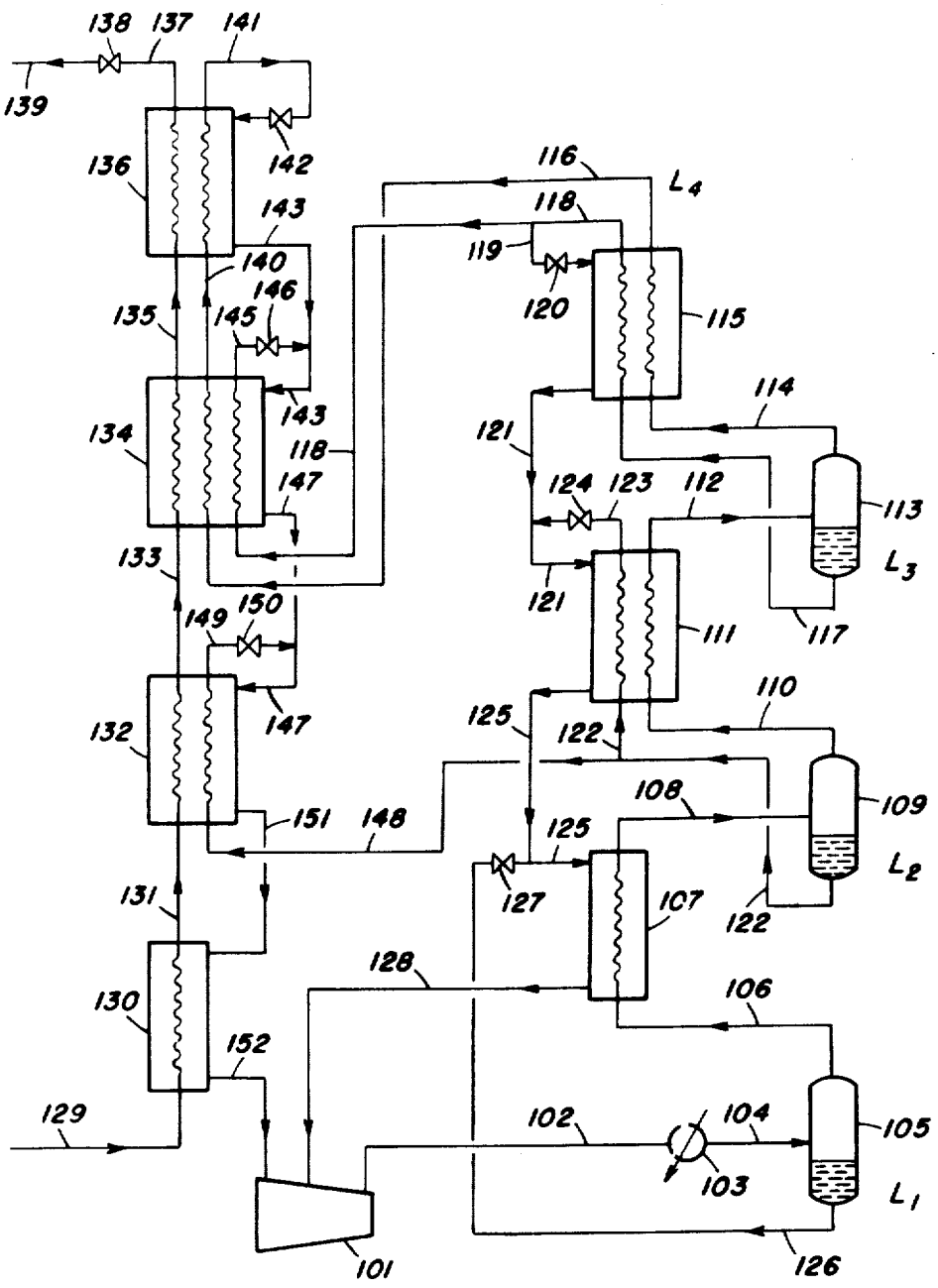
FIG. 4 illustrates a practical example of an application of the invention.

It should be understood that the diagram on FIG. 4 is a specific example and that the sub-cooling of liquid condensates in particular can be carried out in several different ways.

It is to be understood that the cold-producing fluid (i.e., refrigerating fluid) used herein, distinguishes from natural gas as found in nature. Rather, components of natural gas can be used to prepare novel mixtures of different composition than natural gas and such compositions are suitable for the process of this invention. It is advantageous, therefore, that all or substantially all of the components of the cold-producing fluids can be obtained from natural gas in order that the fluids can be prepared; and when nitrogen is a component of the fluids, nitrogen can readily be obtained from air.

I claim:

[1. Process for the liquefaction of a first gas mixture comprising passing said first gas mixture through a first liquefaction system in indirect contact with and in a direction opposite to a refrigerating liquid in a process of vaporization, said refrigerating liquid being admitted as a plurality of portions at several points in said first liquefaction system, said portions being increasingly more volatile in the direction followed by said first gas mixture and said portions of refrigerating liquid resulting from a liquefaction in successive stages in a second liquefaction system, of a second gas mixture obtained by vaporization of the refrigerating liquid in said liquefaction systems, said liquefaction in said second liquefaction system resulting from the vaporization with indirect contact of at least one part of the condensate of each previous stage, with the exception of the first condensate which is obtained by compression of said second gas mixture, the vaporization pressure of the refrigerating liquid in said first liquefaction system being lower than the vaporization pressure in said second liquefaction system, said first gaseous mixture flowing thru the first liquefaction system being out of contact with the fluid in the second liquefaction system throughout the process.]

[2. Process according to claim 1, wherein the absolute vaporization pressure in said first liquefaction system is between about 0.4 and about 3 atmospheres.]

[3. Process according to claim 1, wherein the absolute vaporization pressure in said first liquefaction system is between about 1 and about 1.5 atmospheres.]

[4. Process according to claim 1, wherein the absolute vaporization pressure in said second liquefaction system is between about 4 and about 8 atmospheres.]

[5. Process according to claim 1, wherein the absolute vaporization pressure in said second liquefaction system is between about 5 and about 7 atmospheres.]

[6. Process according to claim 1, wherein the absolute vaporization pressure is approximately 1.5–2 atmospheres in said first liquefaction system and approximately 3.5–4 atmospheres in said second liquefaction system.]

[7. Process according to claim 1, wherein the absolute liquefaction pressure of said second gas mixture is greater than about 31 bars.]

[8. Process according to claim 1, wherein the absolute liquefaction pressure of said second gas mixture is between about 31 and about 50 bars.]

[9. Process according to claim 1, wherein the absolute liquefaction pressure of said fitst gas mixture is between about 30 and about 100 bars.]

[10. Process according to claim 1, wherein said first gas mixture circulates upwardly from below and said refrigerating liquid downwardly from above, with indirect contact with said first gas mixture through the entire first liquefaction system.]

[11. Process according to claim 1, wherein said first gas mixture is a natural gas containing methane; and said second gas mixture contains approximately 0–3% by volume of gas having a volatility which is at least equal to that of nitrogen, 20–32% by volume of methane, 34–44% by volume of ethane, 12–20% by volume of propane, 8–15% by volume of butanes, and 3–8% by volume of hydrocarbons heavier than the butanes.]

[12. Process according to claim 1 wherein at least one of the liquefaction products of said second liquefaction system is sub-cooled before being utilized as a refrigerating liquid in one of said liquefaction systems.]

[13. Process according to claim 1, wherein the first at least partially liquified gas mixture is subjected to expansion permitting to recover a gas having a low liquefaction point, before being subjected to a final cooling.]

[14. Apparatus adapted for liquefaction of gaseous mixtures comprising:

(a) a first indirect heat exchange system for counterflow of a first gas mixture and a refrigerating liquid, said first exchange system comprising a plurality of feed conduits for said refrigerating liquid arranged along said first exchange system and an outlet conduit for vaporized refrigerating liquid, inlet means at one end for said first gas mixture and outlet means at the opposite end for liquified first gas mixture;

(b) a second indirect heat exchange system for counterflow comprising a refrigerating liquid feed pipe system and outlet means of vaporized refrigerating liquid, on one side, inlet means at one end for a second gas mixture and a plurality of outlet conduits for partial condensates of said second gas mixture occurring through stepwise liquefaction, on the other side;

(c) means for compressing vapors of the refrigerating liquids issued from said first and said second exchange system, and means for passing the resulting compressed vapors into said second exchange system as a second gas mixture; and (d) conduits for passing condensates resulting from the stepwise liquefaction of said second gas mixture toward the corresponding inlet means in refrigerating liquid of the two exchange systems, through respective expansion means flowing the first gaseous mixture through the first liquefaction system out of contact with the fluid in the second liquefaction system throughout the process, and means for maintaining the vapor pressure of the refrigerating liquid in the first indirect heat exchange system at a lower pressure than the vaporizing pressure of the refrigerating liquid in said second indirect heat exchange system.]

[15. Apparatus according to claim 14 wherein the heat exchange systems comprise internal piping adapted for the circulation of said refrigerating liquids by gravity.]

[16. Apparatus according to claim 14, wherein an expansion and separation means for gas and liquid is interposed in said first exchange system on the path followed by the first gas mixture.]

*17. A process for totally liquefying a gaseous methane-rich feed stream comprising the steps of:*

*a. supplying said methane-rich feed stream at a superatmospheric pressure and precooling said stream,*

*b. providing a multicomponent refrigerant,*

*c. compressing said multicomponent refrigerant to a superatmospheric pressure,*

*d. cooling said multicomponent refrigerant and phase separating a single vapor fraction and a single liquid fraction from said cooled multicomponent refrigerant,*

*e. subcooling said liquid fraction in heat exchange with itself after expansion to form a first subcooled liquid fraction,*

*f. liquefying and subcooling all of said vapor fraction in heat exchange with said first subcooled liquid fraction, and with itself after expansion, to form a second subcooled liquid fraction, and*

*g. totally liquefying said precooled methane-rich feed stream by further cooling said precooled methane-rich feed stream to at least its liquefaction temperature, at the superatmospheric pressure thereof, solely by progressive heat exchange steps with said first and second subcooled liquid fractions undergoing vaporization,*

*said methane-rich feed stream and said multicomponent refrigerant being in indirect heat exchange with each other throughout the process.*

*18. The process as claimed in claim 17, wherein both of said vaporized liquid fractions are recycled for recompression to said superatmospheric pressure.*

*19. The process as claimed in claim 18, wherein said totally liquefied methane-rich feed stream is expanded.*

*20. The process as claimed in claim 17, further including the step of maintaining a multicomponent refrigerant composition comprising*

| | % by volume |
|---|---|
| $N_2$ and more highly volatile gases | 0–3 |
| methane | 20–32 |
| ethane | 34–44 |
| propane | 12–20 |
| butanes | 8–15 |
| pentanes and heavier fluids | 3–8 |

*21. The process as claimed in claim 17, wherein said multicomponent refrigerant is compressed to a superatmospheric pressure between about 31 and about 50 bars.*

*22. A process for liquefying the major portion of a gaseous, methane-rich feed stream comprising the steps of*

*a. supplying said methane-rich feed stream at a superatmospheric pressure and precooling said stream,*

*b. providing a multicomponent refrigerant at a superatmospheric pressure,*

*c. cooling said multicomponent refrigerant and phase separating a single vapor fraction and a single liquid fraction from said cooled multicomponent refrigerant,*

*d. subcooling said liquid fraction in heat exchange with itself after expansion to form a first subcooled liquid fraction,*

*e. liquefying and subcooling all of said vapor fraction in heat exchange with said first subcooled liquid fraction, and with itself after expansion, to form a second subcooled liquid fraction, and*

*f. liquefying at least the major portion of said methane-rich feed stream by further cooling said precooled methane-rich feed stream to a temperature below about −143° C. solely by progressive heat exchange with said first and second subcooled liquid fractions undergoing vaporization,*

*said methane-rich feed stream and said multicomponent refrigerant being in indirect heat exchange with each other throughout the process.*

*23. The process as claimed in claim 22, wherein both of said vaporized liquid fractions are recycled for recompression to said superatmospheric pressure.*

*24. The process as claimed in claim 23, wherein said liquefied methane-rich feed stream is expanded.*

*25. The process as claimed in claim 22, wherein said multicomponent refrigerant is compressed to a superatmospheric pressure between about 31 and about 50 bars.*

*26. A refrigeration system for totally liquefying a gaseous methane-rich feed stream at superatmospheric pressure comprising in combination*

*a. a first multi-stage heat exchanger means connected to said free stream for precooling said feed stream,*

*b. means for supplying a multicomponent refrigerant,*

*c. a compressor for compressing said multicomponent refrigerant to a superatmospheric pressure,*

*d. a second multi-stage heat exchanger means for cooling and for partially condensing said multicomponent refrigerant,*

*e. a phase separator connected to said second multi-stage heat exchanger means for separating said partially condensed multicomponent refrigerant into a vapor fraction and a condensed liquid fraction,*

*f. third heat exchange means connected to said phase separator and including expansion means for subcooling said condensed liquid fraction in heat exchange with itself, after expansion in said expansion means, to form a first subcooled liquid fraction,*

*g. fourth heat exchanger means connected to said phase separator means and including expansion means for liquefying and subcooling said vapor fraction in heat exchange with said first subcooled liquid fraction, and with itself after expansion in said expansion means, to form a second subcooled liquid fraction, and*

*h. fifth heat exchanger means for further cooling said precooled stream to at least its liquefaction temperature, at the superatmospheric pressure thereof, and totally liquefying said precooled feed stream by passing said feed stream in heat exchange with said first subcooled liquid fraction undergoing vaporization and then in heat exchange with said second subcooled liquid fraction undergoing vaporization,*

*said methane-rich feed stream and said multicomponent refrigerant being in indirect heat exchange with each other throughout the process.*

*27. A refrigeration system as claimed in claim 26 further including conduit means connected to said fifth heat exchanger means and to said compressor for returning said vaporized first and second fractions to said compressor as said multicomponent refrigerant.*

*28. A refrigeration system as claimed in claim 27 further including conduit means connected to said fifth heat exchanger means for withdrawing said totally liquefied feed stream from said fifth heat exchanger means.*

*29. A refrigeration system as claimed in claim 28 including expansion means in said conduit means for expanding said totally liquefied feed stream.*

*30. A refrigeration system for liquefying the major portion of a gaseous methane-rich feed stream at a superatmospheric pressure comprising in combination*

*a. a first multi-stage heat exchanger means for precooling said feed stream,*

*b. means for supplying a multicomponent refrigerant,*

*c. a compressor for compressing said multicomponent refrigerant to a superatmospheric pressure,*

*d. a second multi-stage heat exchanger means for cooling and to partially condense said multicomponent refrigerant,*

*e. a phase separator connected to said second multistage heat exchanger means for separating said partially condensed multicomponent refrigerant into a single vapor fraction and a single condensed fraction,*

*f. third heat exchanger means connected to said separator and including expansion means for subcooling said condensed liquid fraction in heat exchange with itself, after expansion in said expansion means, to form a first subcooled liquid fraction,*

*g. fourth heat exchanger means connected to said separator and including expansion means for liquefying and subcooling said vapor fraction in heat exchange with said first subcooled liquid fraction, and with itself, after expansion in said expansion means, to form a second subcooled liquid fraction, and*

*h. fifth heat exchanger means connected to said first heat exchanger means for further cooling said feed stream to at least −143° C. solely by heat exchange with said first and second subcooled liquid fractions undergoing vaporization,*

*said methane-rich feed stream and said multicomponent refrigerant being in indirect heat exchange with each other throughout said system.*

*31. A refrigeration system as claimed in claim 30 including passage means connected to said fifth heat exchanger means for returning said vaporized fractions to said compressor.*

*32. A refrigeration system as claimed in claim 31 including expansion means connected to said fifth heat exchanger means for reducing the pressure of said cooled feed stream to a reduced pressure.*

*33. A refrigeration system for liquefying the major portion of a methane-rich feed stream comprising the combination*

*a. means supplying a multicomponent refrigerant including one component having a boiling point substantially below that of methane,*

*b. first heat exchanger means for precooling and partially condensing a substantial portion of said multicomponent refrigerant,*

*c. a phase separator connected to said first heat exchanger means for separating said partially condensed multicomponent refrigerant into a vapor fraction and a condensed liquid fraction,*

*d. second heat exchanger means connected to said separator for subcooling said condensed liquid fraction in heat exchange with itself after expansion to form a first subcooled liquid fraction,*

*e. third heat exchanger means connected to said separator for liquefying and subcooling said vapor fraction in heat exchange with said first subcooled liquid fraction, and with itself after expansion, to form a second subcooled liquid fraction, and*

*f. fourth heat exchanger means for liquefying the major portion of said precooled feed stream in heat exchange with said first and second subcooled liquid fractions undergoing vaporization,*

*said methane-rich feed stream and said multicomponent refrigerant being in indirect heat exchange with each other throughout the process.*

*34. In a refrigeration process wherein a multicomponent refrigerant is in indirect heat exchange throughout the process with a methane-rich feed stream and is partially condensed to form a single vapor fraction and a single liquid fraction, the improvement which comprises*

*a. subcooling said liquid fraction in heat exchange with itself after expansion to form a first subcooled liquid fraction, and*

*b. liquefying and subcooling all of said vapor fraction in heat exchange with said first subcooled liquid fraction, and with itself after expansion, to form a second subcooled liquid fraction.*

* * * * *

UNITED STATES PATENT AND TRADEMARK OFFICE

CERTIFICATE OF CORRECTION

PATENT NO. : Re. 30,085

DATED : August 28, 1979

INVENTOR(S) : Jean C. PERRET

It is certified that error appears in the above-identified patent and that said Letters Patent are hereby corrected as shown below:

Title page, left column, line 2, replace "CODING" with --COOLING--.

Column 1, line 2, replace "CODING" with --COOLING--.

Signed and Sealed this

*Eighteenth* Day of *March 1980*

[SEAL]

*Attest:*

SIDNEY A. DIAMOND

*Attesting Officer*

*Commissioner of Patents and Trademarks*